United States Patent [19]
Fritts

[11] 4,338,382
[45] Jul. 6, 1982

[54] BATTERY SAFETY TERMINAL
[75] Inventor: David H. Fritts, Dayton, Ohio
[73] Assignee: The United States of America as represented by the Secretary of the Air Force, Washington, D.C.
[21] Appl. No.: 242,815
[22] Filed: Mar. 11, 1981
[51] Int. Cl.³ .................................................. H01M 2/12
[52] U.S. Cl. .................................... 429/53; 429/89
[58] Field of Search .................................... 429/53–56, 429/89, 82, 72, 179; 220/203; 339/263 B; 174/187

[56] References Cited
U.S. PATENT DOCUMENTS

| | | | |
|---|---|---|---|
| 3,214,300 | 10/1965 | Nordvik | 429/56 |
| 3,497,395 | 2/1970 | Kohen | 429/55 |
| 3,497,396 | 2/1970 | Goodwin | 429/53 |
| 3,537,903 | 11/1970 | Braun | 429/54 |
| 3,622,397 | 11/1971 | Belove | 429/55 |
| 4,131,722 | 12/1978 | Sugalski | 429/55 |

*Primary Examiner*—Anthony Skapars
*Attorney, Agent, or Firm*—Donald J. Singer; Bernard E. Franz

[57] ABSTRACT

A safety electrical disconnect is incorporated within the battery terminal to break the circuit upon excessive internal pressure build-up due to extended discharge or over charge. A burst diaphragm ruptured by excessive pressure forces a ball through a normally restraining split ring to thereby interrupt the electrical circuit continuity. The ball, upper seat and split ring can be designed to either prevent further escape fo internal gas or provide for controlled venting. The burst diaphragm may be replaced by another pressure sensing device such as a pop-off valve. For high current capability, the ball and ring may be replaced by a suitable arrangement such as a sliding cylindrical connector.

9 Claims, 8 Drawing Figures

BATTERY SAFETY TERMINAL

RIGHTS OF THE GOVERNMENT

The invention described herein may be manufactured and used by or for the Government of the United States for all governmental purposes without the payment of any royalty.

BACKGROUND OF THE INVENTION

This invention relates to safety terminals for controlling the internal pressurization and/or electric circuit of an electrochemical cell which under some conditions produces excessive gas pressure upon being electrically driven.

Sealed casings hereto provided for electrical devices, such as rechargeable nickel-cadmium batteries and other electrical devices which may, from time to time generate gases within the sealed container, have included safety vents for releasing or venting gases at abnormal pressures. The use of a rupturable diaphragm to release internal gas pressure is old as shown for example by U.S. Pat. No. 3,214,300. Use of a ball valve in a battery pressure relief device is illustrated in U.S. Pat. No. 3,497,396, and a resilient deformable ring device used in a battery venting system is described in U.S. Pat. No. 3,497,395.

A $Li/SO_2$ cell normally has $SO_2$ gas under some pressure. If such a cell is overdischarged a violent explosion can result from the excessive pressure. It is desirable to disconnect the battery from the electrical circuit prior to a hazardous overpressure condition developing due to extended discharge (or overcharge for secondary type cells). Current technology requires a pressure transducer, control circuitry and circuit relays to sense the excess pressure and disconnect the circuit.

SUMMARY OF THE INVENTION

An object of the invention is to provide a simple arrangement to detect when battery internal pressure becomes excessive and to automatically disconnect the battery from external electrical circuitry.

According to the invention, the circuit disconnect means and pressure sensor are integral with an electric terminal of each cell. This terminal can also serve as an overpressure vent if so desired.

A specific embodiment of a battery safety terminal according to the invention includes a burst diaphragm, a metal ball, and a metal split ring. The electric circuit normally goes from the outer part of the metal terminal through the split ring and the ball to a current collector within the cell. When cell overpressure ruptures the burst diaphragm, the subsequent pressure applied to the ball forces it through the split ring to break the electrical connection. The ball is then held against a tapered surface by the split ring and cell pressure to effect a seal or controlled vent.

Several variations of the above embodiment have been designed which allow, for example: high current capability, automatic remake of the electrical circuit after pressure has been reduced, and/or positive seal of electrolyte and cell gases.

DETAILED DESCRIPTION

Figure 1:
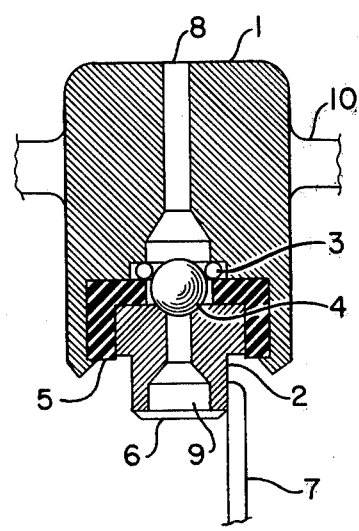
FIGS. 1, 3 and 6 are cross section views of three different embodiments of the invention.
Figure 2:
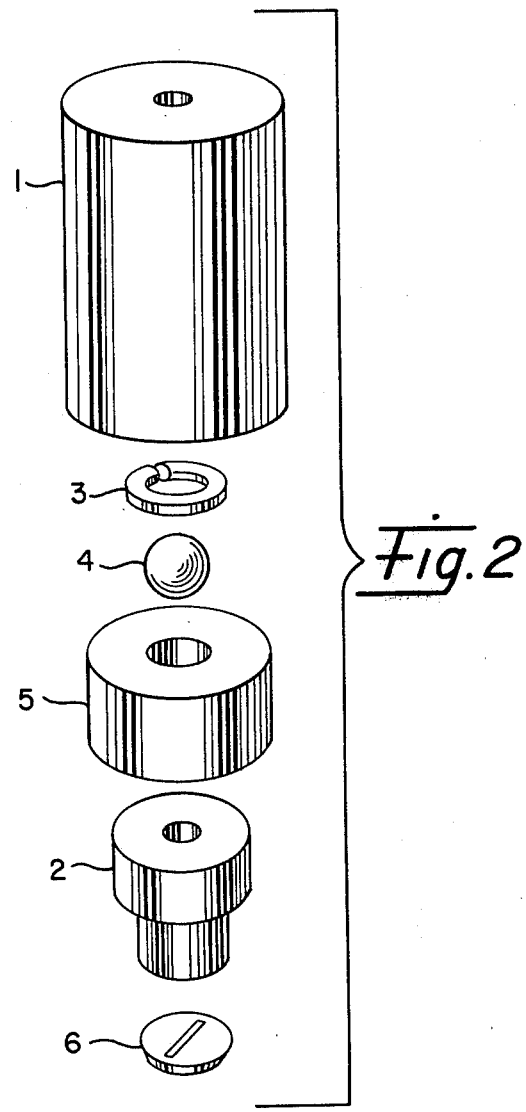
FIGS. 2, 4 and 7 are exploded views respectively of the three embodiments.

FIGS. 1 and 2 show a first embodiment of a battery safety terminal for incorporation into, for example, a D size $Li/SO_2$ cell. Only a small portion of the cell case 10 is shown. The principal outer part 1 of the terminal extends through the cell case and is sealed thereto by suitable means. The terminal also has an inner metal part 2. These metal parts 1 and 2 and also the cell case 10 are preferably made of stainless steel to resist the corrosive contents of the cell. If it is required that the terminal be electrically insulated from the cell case, a glass-to-metal seal may be used between part 1 and the cell case 10. In the drawing the portion of part 1 outside the cell case is shown relatively short, but it should be understood that it would for any particular type cell be made of an appropriate size and configuration for attachment of an electrical connector or otherwise making contact in a circuit. A current collector 7 is shown spot welded to part 2 within the cell.

The remaining parts of the terminal comprise a metal split ring 3, a steel ball 4, a teflon insulator 5, and a burst diaphragm 6 of stainless steel or nickel foil.

The part 1 has an opening 8 extending through the center comprising four cylindrical portions and one tapered conical portion. The lower portion of the opening has a large diameter leaving only a wall at the outside. The next portion is a recess for the split ring 3. Then comes a short cylindrical portion of smaller diameter than the recess, a conical tapered section and finally a small diameter vent hole to the outside. The metal part 2 also has a hole 9 extending through its center, comprising a cylindrical portion at the bottom, a tapered conical portion, and a smaller diameter cylindrical portion extending into the chamber between parts 1 and 2. At the top of the hole 9 the part 2 includes a cup in the form of a section of a sphere or cone to receive the steel ball 4.

The teflon insulator 5 is shaped to fit between metal parts 1 and 2, with a hole in the center forming part of the chamber for the ball 4. The part 1 is crimped at the bottom to securely hold the parts together. The burst diaphragm 6 is welded to the part 2 to cover the bottom of hole 9.

The parts should have a close fit to provide a good electrical circuit path from part 1, through the split ring 3 and ball 4 to part 2 and the current collector 7.

When excessive discharge of the cell occurs at the end of its life, or if the cell is recharged excessively, the gas pressure may increase. Cell overpressure ruptures the burst diaphragm 6. The subsequent pressure applied to the steel ball 4 forces it through the split ring 3 breaking the electrical connection. The cell is thus electrically isolated. The steel ball is held against the upper tapered surface in hole 8 by the split ring 3 and the cell pressure, effecting a seal to prevent further escape of the gas. With the electric circuit broken, there is no further increase of pressure. If a controlled vent is desired, a small channel may be formed in part 1 along the tapered surface of hole 8.

Figure 3:
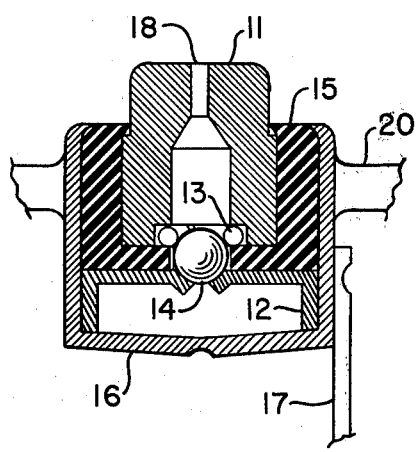
Figure 4:
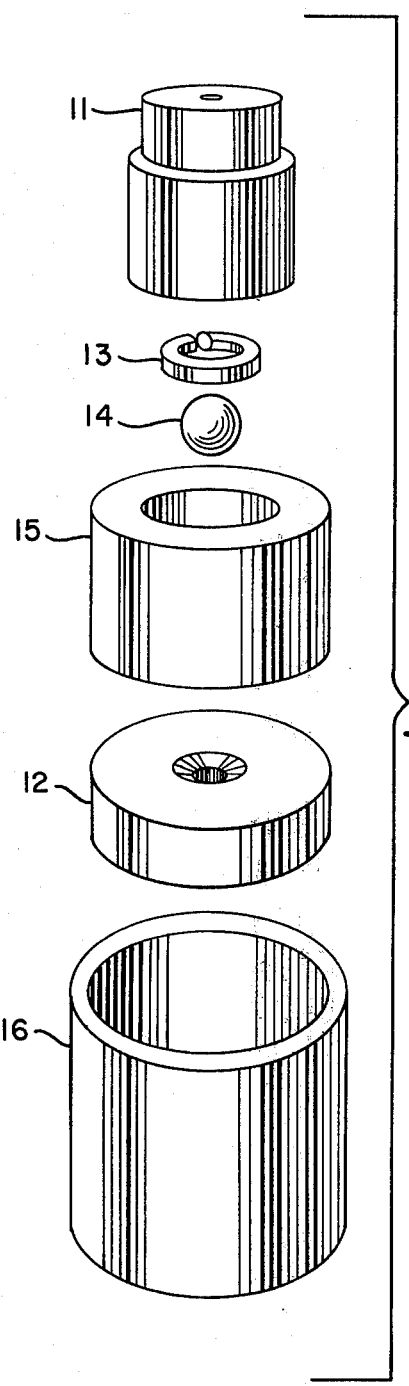
Figure 5:
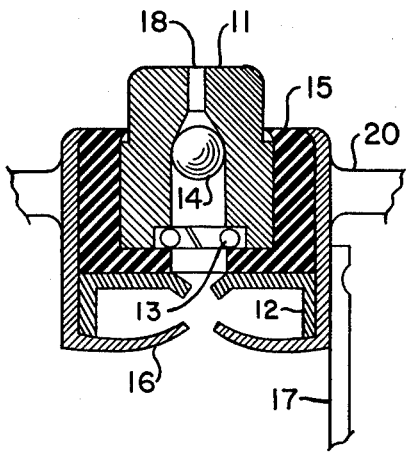
FIG. 5 is a cross section view of the embodiment of FIG. 3, in the position after over pressure has occurred.

FIGS. 3, 4 and 5 show a second embodiment to provide a more positive seal of electrolyte and cell gases. In this embodiment, the burst diaphragm is an internal portion of a stainless steel cup-shaped part 16. The remainder of the safety terminal is assembled inside this cup. Thus part 16 is the only part of the terminal in contact with the contents of the cell, and therefore is the only part which need be stainless steel. This part is sealed to the cell case 20, with a glass-to-metal seal if electrical isolation is required. The current collector 17 is spot welded to part 16.

The main outer metal part 11 of the terminal is formed very similar to part 1 of FIG. 1, except that the cylindrical portion of the hole 18 below the tapered section is somewhat longer. The recess for the metal split ring 13 is now the bottom of part 11.

The inner metal part 12 is cup shaped, with its outer cylindrical surface close fitted into part 16. The teflon insulator 15 separating part 11 from parts 12 and 16 is similar to that in FIG. 1, except that it is inverted. Part 12 has a hole in its center with a depressed rim to receive the metal ball 14. The upper edge of part 16 is crimped over the insulator 15. The insulator 15 has a lip which extends over an edge on part 11, so that the parts of the terminal are held tightly together.

FIG. 5 shows the condition of the terminal after excess pressure has ruptured the burst diaphragm. The ball 14 has passed through the split ring 13, and is held by the gas pressure in the tapered section of hole 18. Again if a controlled vent is desired, a channel may be formed in part 11 along the tapered section and lower sections of the hole 18.

Figure 6:
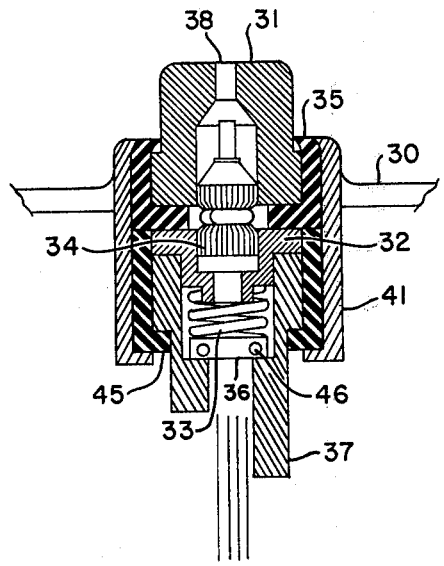
Figure 8:
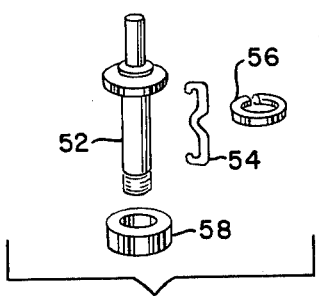
FIG. 8 is an exploded view of a moving conductor of the embodiment of FIG. 6.
Figure 7:
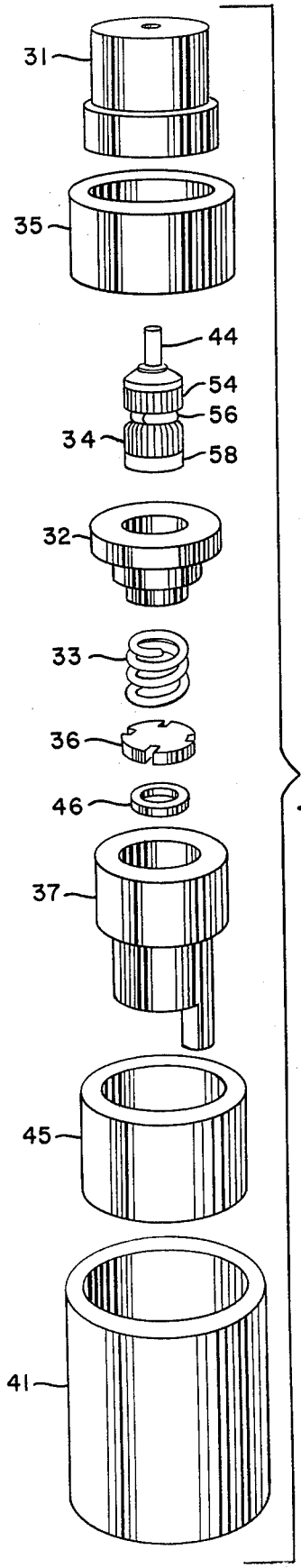

A third embodiment of a safety terminal for high current capability is shown in FIGS. 6, 7 and 8. It makes use of an electrical connector socket 34 of the type described in U.S. Pat. No. 2,681,441 by J. S. Linn. The socket replaces the ball and split ring of the other embodiments.

The parts shown in FIG. 7 are an outer metal terminal part 31, an inner metal conductor 32, insulators 35 and 45, a stainless steel part 37 with a current collector, an outer case 41, the movable conductor 34, a return spring 33, a pop-off valve 36 and an O-ring 46.

The stainless steel outer case 41 is sealed to the cell case 30. The outer terminal member 31 has a hole 38 with a tapered portion and a longer cylindrical portion within which connector 34 can move. The connector 34 also normally has its lower end located within a hole of member 32, resting on an inner edge thereof. The pop-off valve 36 is held in place by the spring 33 located between a bottom protrusion of part 32 and the valve. An O-ring 46 in a groove of the valve 36 provides a seal with part 37. The top of outer case 41 and insulator 35 are crimped to hold the terminal together.

The parts of the connector 34 are shown in FIG. 8. It comprises a center insulated shaft 52 on which a plurality of conductor elements 54 are assembled. These are held in place by a ring 56. An end piece 58 is threaded onto the shaft 52.

Over pressure in the cell causes the pop-off valve 36 to compress the spring 33, so that the gas then forces the movable conductor 34 to move upward so that it is entirely within the hole of member 31, thereby breaking the electrical connection to member 32. The movable conductor 34 may be provided with a tip 44 which moves up to project out of hole 36, to provide an indication that the cell has had over pressure and that the electrical connection is broken.

Thus, while preferred constructional features of the invention are embodied in the structure illustrated herein, it is to be understood that changes and variations may be made by the skilled in the art without departing from the spirit and scope of my invention.

I claim:

1. A safety terminal for a normally sealed electric device having a container subject to internal gas pressure, the terminal being incorporated in one outer wall of said container, wherein said terminal comprises:
   an outer member separated by insulating means from an inner member which is electrically connected to current collector means within the device, the first and second members being electrically conductive, bridging means which is located to normally complete an electrical conducting circuit path between said outer member and said inner member, the bridging means being located in a chamber within said terminal, the chamber being normally sealed off from the interior of said container, pressure sensing means which is constructed to respond to excess gas pressure within the container to open said chamber to the interior of the container, and the resulting excess gas pressure entering said chamber being effective to force said bridging means to a position such that the electrical circuit path is broken between said outer member of the terminal and said inner member.

2. A safety terminal as recited in claim 1, wherein said bridging means comprises a metal ball and a metal split ring, with the metal ball normally resting in electric contact with said second member, and the split ring being normally of smaller inner diameter than the diameter of the ball, with the split ring located in a recess of the outer member and pressed against one side of the ball so that the split ring and ball form a conductive path between the outer and the inner members; and wherein said resulting excess gas pressure is effective to force the ball through the split ring, the split ring being expanded and then reclosed to thereby hold the ball away from the inner member.

3. A safety terminal as recited in claim 2, wherein said chamber is formed by an opening through said insulating means and openings in said outer and inner members, with a further opening of substantially smaller diameter than that of the ball extending from the chamber through the first member to the outside, with a tapered section between the chamber and said further opening, and wherein after the ball is forced through the split ring said resulting excess gas pressure holds it in said tapered section.

4. A safety terminal as recited in claim 3, wherein there is an opening through the second member extending from said chamber, and wherein said pressure sensing means is a burst diaphragm which normally closes off said opening through the second member, said response to excess gas pressure being the rupturing of the burst diaphragm.

5. A safety terminal as recited in claim 4, wherein said burst diaphragm is an integral portion of a stainless steel member which is cup-shaped and located to completely separate the other members of the terminal from the interior of said container and extending through said one outer wall, except that said current collecting means is attached to said stainless steel member on the inside of the container.

6. A safety terminal as recited in claim 1, wherein said bridging means comprises a connector which is generally cylindrical and formed from a plurality of elongated electrically conductive elements, wherein said chamber extends through said insulating means and into both said outer and inner members, the chamber being cylindrical and of a diameter substantially equal to the diameter of said connector to provide electrical contact to the first and second members but still being movable, the portion of the chamber within the first member and the insulating means being longer than the connector, so that said resulting excess gas pressure forces the connector completely out of contact with the inner member.

7. A safety terminal as recited in claim 6, wherein said pressure sensing means comprises a valve and spring, and said response to excess gas pressure comprises movement of the valve to compress the spring.

8. A safety terminal as recited in claim 7, wherein there is an opening through said outer member from said chamber to the outside, and wherein said connector has a tip portion located such that after the connector has moved to said position in which the electrical connection is broken, said tip portion extends through said opening of the outer member and projects outside, to thereby provide an indication of the condition.

9. A safety terminal as recited in any of claims 1, 2, 3, 4, 5, 6 or 7, wherein said electric device is an electrochemical cell used as a source of electrical energy.

* * * * *